INVENTOR
WILFRED F. TRAUGOTT, DECEASED
By BERTHA D. TRAUGOTT, EXECUTRIX

BY *Shoemaker and Mattare*

ATTORNEYS 3,163,441
ADJUSTABLE PIVOTAL WHEEL MOUNTING
Wilfred F. Traugott, P.O. Box 608, West Point, Va.;
Bertha D. Traugott, executrix of estate of Wilfred
F. Traugott, deceased
Filed May 2, 1962, Ser. No. 191,983
9 Claims. (Cl. 280—96.2)

The present invention relates to a new and novel adjustable pivotal mounting, and more particularly to a pivotal mounting which is adapted to adjust the caster and camber of a vehicle front wheel in the front suspension assembly of an automotive vehicle.

The present invention is for use especially with automotive vehicles of the type wherein the front wheels are independently suspended from the vehicle frame, this type of assembly generally employing upper and lower control arms. These control arms are pivotally connected at their inner ends to the vehicle frame and the outer ends of these control arms support the wheel spindle assembly. These control arms project generally laterally from the vehicle frame and a coil spring is usually utilized and seated upon a portion of the frame and engaging one of these control arms, whereby the wheel is sprung from the frame.

This construction is well-known, and the caster and camber of the wheel are adjusted by shifting one end or the other of the wheel spindle either in a fore and aft direction or in an in and out direction, as the case may be.

These adjustments are commonly done by the utilization of shims which are placed behind the two mounting bolts of the inner pivot shafts which support the control arms.

The present invention represents an improvement over U.S. Patent 2,859,058, wherein an eccentric bushing is employed for adjusting the caster and camber. The eccentric bushing arrangement in this patent provides caster and camber adjustments, but the construction has certain disadvantages from the standpoint that the eccentric bushing is locked to the control arm so that the caster and the camber continually change upon pivotal movement of the control arm with respect to the associated pivot shaft and the frame of the vehicle. This is generally undesirable and it is a particular feature of the present invention to provide an arrangement whereby the adjusting bushing thereof is locked to the pivot shaft and the control arm rotates with respect to the adjusting bushing. With the arrangement of the present invention, the caster and camber adjustments may be made in a most simple and expeditious manner, and yet at the same time, the adjustment does not change upon pivotal movement of the control arms and once the adjustment has been made, the adjusting bushing may be fixedly locked in the desired operative position.

In the construction of the present invention, the adjusting bushing is provided with a cylindrical outer bearing surface upon which another bushing or bearing is journaled. This bushing or bearing is rotatable with respect to the adjusting bushing that is journaled in it. This rotatable bearing, that is rotatable with respect to the adjustable bushing, is in turn received within an opening in the control arm. In my application S.N. 87,189, filed February 6, 1961, now Patent No. 3,124,370, this rotatable bearing in which the adjustable bushing is journaled was also rotatable with respect to the control arm in which this rotatable bearing was received. In accordance with the present invention, an improvement has been made over the above-mentioned United States patent application and means have been provided for preventing rotation of this rotatable bearing with respect to the control arm in which it is received. Thus, the present invention provides a novel construction of the adjusting bushing, the rotatable bearing in which the adjusting bushing is journaled, and the control arm in which the bearing is disposed. It has been determined that the rotatable bearing for the adjusting bushing will wear out much quicker in use if it has relative movement with respect to the control arm. Therefore, the present invention provides means whereby this bearing is locked with respect to the control arm so that it will not turn, while still serving the adjusting bushing in the manner described in United States patent application S.N. 87,189, filed February 6, 1961.

In accordance with the present invention, novel locking means have been provided which are slidably mounted on the bearing in which the adjustable bushing is journaled and which intermeshes with a portion of this bearing and which further intermeshes with a portion of the control arm so as to prevent relative rotation of this bearing with respect to the control arm.

It is an object of the present invention to provide means for permitting relative rotation of the adjusting bushing for a pivot shaft with respect to the bearing in which it is journaled, while at the same time, preventing rotation of the bearing with respect to the control arm in which it is received to prevent inordinate wear of the bearing.

It is another object of the present invention to provide a simple and inexpensive means for locking the bearing member in which the adjusting bushing is journaled with respect to the control arm associated with said bearing and adjustable bushing.

It is still a further object of the present invention to provide locking means for preventing rotation of the bearing member in which the adjusting bushing of a pivot shaft is journaled, which locking means do not interfere with adjustment of the adjustable bushing.

It is yet another object of the present invention to provide locking means for preventing rotation of the bearing in which the adjustable bushing is journaled for locking the bearing to the control arm or the A frame of a vehicle associated therewith, which can be fixedly locked to the control arm by merely bending projecting ears to engage the bearing and the control arm.

It is still another object of the present invention to provide a shim type locking means for locking the bearing in which an adjustable bushing of a pivot shaft is journaled to the control arm to prevent relative rotation of the bearing with respect to the control arm, while permitting relative rotation of the adjusting bushing with respect to the bearing.

The adjusting bushing itself is provided with a longitudinally extending bore formed therethrough, which bore is disposed in eccentric relation to the cylindrical outer support surface formed on the adjusting bushing. A portion of an inner pivot shaft for an associated control arm of a conventional automotive vehicle extends through this bore in the adjusting bushing. The pivot shaft is suitably rigidly secured to the frame and the adjusting bushing may be locked to the pivot shaft through the intermediary of spacer means and a cap screw and pressure plate arrangement which is adapted to rigidly secure the adjusting bushing to the end portion of the pivot shaft. The locking means of the present invention are carried on the bearing in which the adjusting bushing is journaled and the locking means have projecting ears thereon engaging this bearing and the control arm so as to prevent relative rotation of the bearing with respect to the control arm.

Various other objects and advantages of the present invention will be readily apparent from the following detailed description when considered in connection with the accompanying drawing forming a part thereof and in which.

Figure 1:
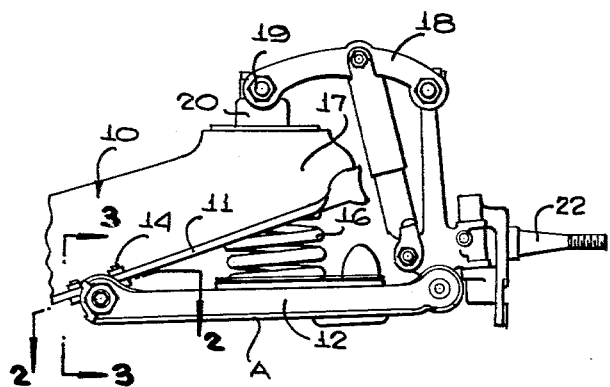
FIG. 1 is a fragmentary front elevational view illustrating a front wheel vehicle suspension assembly with which the present invention is used.

Referring to the drawings, the reference numeral 10 generally designates a frame of a vehicle including a rigid channel member 11 which generally extends laterally of the vehicle. A conventional lower control arm 12 extends laterally outwardly of the frame 10 and is pivotally supported by an inner pivot shaft 13 which is fixed to the frame member 11 by bolts 14. The lower control arm 12 is generally A-shaped and is sometimes referred to as an A frame and is further identified by letter A on the drawings.

A coil compression spring 16 is seated within a suitable well provided in the lower control arm 12 with the upper end of the coil spring being seated against an abutment 17 formed integral with the frame member 11.

A conventional upper control arm 18 is pivotally supported by an inner pivot shaft 19 which is connected by bolt means to an upstanding portion 20 fixed to the frame member 11.

A wheel spindle assembly generally is supported at the upper and lower portions thereof by ball joints mounted at the outer ends of the upper and lower control arms respectively. This is conventional suspension arrangement associated with the front wheels of an independently sprung front wheel type vehicle.

The present invention relates to the adjustable pivotal mounting for varying caster and camber, and the invention may be incorporated in association with either or both the lower and the upper inner pivot shafts respectively. The construction of the novel structure associated with the lower pivot shaft will be described herein.

Figure 2:
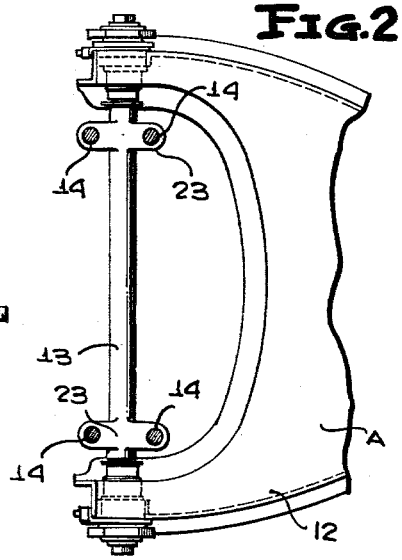
FIG. 2 is a top plan sectional view taken substantially along lines 2—2 of FIG. 1.
Figure 3:
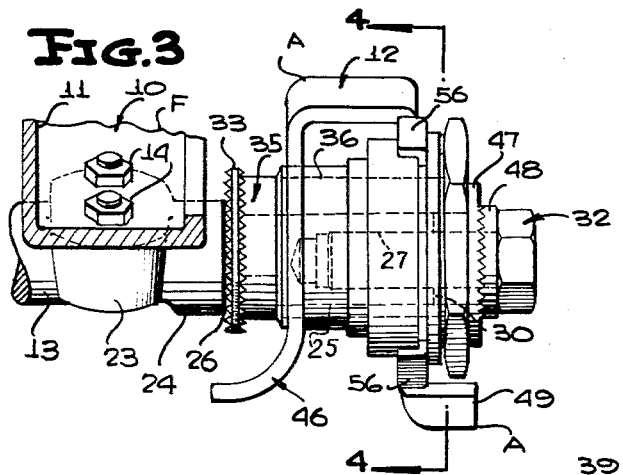
FIG. 3 is an enlarged elevational section taken along lines 3—3 of FIG. 1.

As seen from FIGS. 2 and 3, the lower control arm pivot shaft 13 includes a central portion with a transverse lug 23 formed integral therewith adjacent the end thereof through which the bolt means 14 are threaded for fixedly connecting the pivot shaft to the channel members 11. Beyond the lug member 23, the pivot shaft is laterally offset as at 24 and terminates in a reduced cylindrical diameter 25 so that a shoulder 26 is formed between the portions 24 and 25.

The structure mounted at each end of the pivot shaft is identical, and accordingly, a description of the structure employed at one end of the pivot shaft is equally applicable to the structure at the opposite end of the shaft. An internally threaded opening or bore 27 extends longitudinally of the pivot shaft in the reduced diameter 25 thereof and opens through the outer end of this reduced portion 25 of the shaft as shown in FIG. 3, the outer end of the shaft being designated 30. This bore 27 is internally threaded and is adapted to receive a threaded cap screw 32 therein, the cap screw having a threaded shank and an enlarged head.

Disposed on the reduced portion 25 of the shaft adjacent the shoulder 26 thereof is a lock washer 33 having a plurality of serrations on the opposite sides thereof so as to bite into or grip the adjacent shoulder 26 and an adjustable bushing 35. The adjustable bushing 35 is disposed on the portion 25 of the shaft adjacent the lock washer 33 and completely surrounds the outer surface of the shaft portion 25 and extends beyond the end 30 of this portion of the shaft.

The adjusting bushing is provided with a cylindrical outer support surface which is adapted to receive and support a nylon bushing 36 thereabout so that the adjustable or adjusting bushing 35 is rotatably journaled in the bearing or nylon bushing 36. Also formed on adjusting bushing 35 is an enlarged radially extending portion 38 having flats 39 thereon formed on the outer periphery thereof for adjusting the bushing 35. The bushing 35 is adjusted by means of a wrench applied to the flats 39 to permit rotation of the adjusting bushing with respect to the pivot shaft 13 and particularly with respect to the reduced diameter 25 of this pivot shaft. The inner end of the bushing 35 is adapted to abut and engage the serrations on the side of the washer 33, as best seen in FIG. 3.

Figure 4:
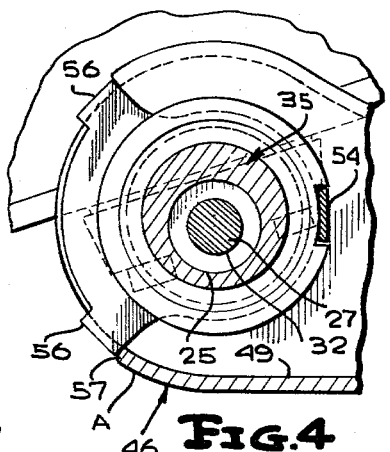
FIG. 4 is a section taken along lines 4—4 of FIG. 3.

The nylon bearing 36 has a cylindrical inner surface and a stepped outer surface with the inner end of the bearing 36 having its outer surface 40 of a diameter substantially smaller than the diameter 41 of its outer end. An enlarged radially extending portion 42 is formed on the outer end of the bearing 36 as best seen in FIG. 4. A rectangular notch or recess 43 is formed in this portion 42 to receive locking means to prevent the bearing 36 from turning with respect to the A frame 12 as hereinafter described.

Figure 5:
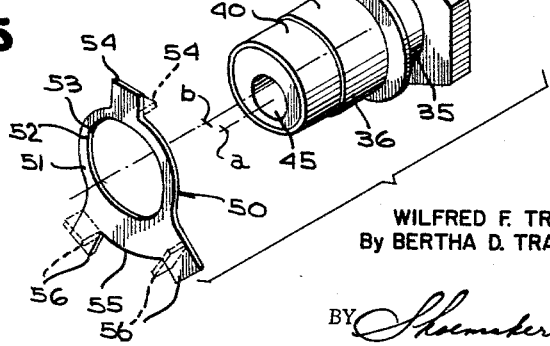
FIG. 5 is an exploded perspective view illustrating the arrangement of the adjusting bushing, the bearing in which it is journaled and the locking means for preventing rotation of the bearing with respect to the control arm in which it is received.

A bore 45 extends longitudinally completely through the adjusting bushing as seen in FIG. 5, which bore is eccentric to the longitudinal axis of the outer cylindrical surface of the adjusting bushing. In other words, the center of bore 45 is indicated by the letter $a$, while the center or longitudinal axis of the adjusting bushing 35, particularly with respect to the outer cylindrical surface thereof, is indicated by the letter $b$. With this arrangement, it is apparent that rotation of the adjusting bushing 35 about the associated pivot shaft portion 25 will produce eccentric movement of the outer cylindrical surface of the adjusting bushing 35 so as to suitably adjust the position of this outer surface of the bushing to vary camber and caster as desired, since the reduced diameter 25 of the pivot shaft extends through the bore 45 of the adjusting bushing 35.

In assembling the device of the present invention, the lock washer 33 is first slid onto the portion 25 of the pivot shaft until it is adjacent shoulder 26 thereon. Next, the adjusting bushing 35 is slid over the end of 25 until it loosely abuts or contacts the lock washer 33. At this time, the bearing 36 has alretdy been inserted within the aligned opening in the U-shaped portion or channel portion 46 of the A frame as seen in FIG. 3, so that the bearing 36 surrounds the outer surface of the adjusting bushing 35 between and beyond the two legs of the U-shaped channel member 46. Thereafter, a pressure plate 47 and a lock washer 48 are mounted on the cap screw 32 and the cap screw is threaded into the bore 27 so that the pressure plate 47 bears against the outer surface or outer end of the radial portion 38 of the adjusting bushing 35, with the lock washer 48 bearing against the outer surface of the pressure plate 47. The pressure plate 47 and the lock washer 48 are also provided with serrations in the side walls thereof so that when the cap 32 is threaded home, it will lock the washer 33 against the shoulder 26, and will lock the inner end of the bushing 35 against the lock washer 33, with the pressure plate 47 and 48 and 32 all locked together and further locked on the pivot shaft 13 so that none of these parts will have relative movement or rotate with respect to each other.

When it is desired to reset or adjust the eccentricity of the pivot shaft with respect to the frame 12, it is merely necessary to loosen the cap screw 32 and thereafter turn the radial portion 38 of the adjusting bushing with a wrench to vary the camber or caster as the case may be. Thereafter the screw cap is threaded home again and all the parts are fixed to one another as before. This permits the adjusting bushing 35 to be journaled within the nylon bearing 36 and to have relative rotation therewith.

In accordance with the present invention, while it is desired to permit the bushing 35 to be rotatable with respect to its bearing 36, it is not desired to have the bearing 36 rotate with respect to the A frame 12.

Accordingly, a circular locking means generally designated 50 is provided which consists of a thin vertical brass shim or member 51 having a circular upper portion 52 with a circular opening or aperture 53 therein, an upwardly projecting ear 54 rectangular in shape is provided on top of the portion 52 and is adapted to be bent or turned down at a right angle with the portion 52 so as to form a tooth that engages or meshes with the notch 43 in the bearing 36. The bottom portion of the member 50 is provided with an arcuate depending portion 55 on the bottom thereof, with two vertically downwardly extending ears 56 thereon and spaced apart from each other. The ears 56 are substantially rectangular in shape and similar to ear 54 and are further provided to be bent at right angles as indicated in dotted lines, to the portion 52 of the locking means, and in a direction opposite to or away from the direction of bend of the lug 54. The ears 56 are bent inwardly with respect to the U-shaped member 46 and are disposed in an elongated slot 57 (see FIG. 4) formed in the outer leg 49 of the U-shaped member, so as to prevent relative rotational movement of the bearing with respect to the U-shaped member 46 of the A frame.

Thus, the present invention provides a novel adjusting bushing for use with the front wheel of a vehicle in which the adjusting bushing may be easily adjusted to vary the camber or caster of the wheel, and which bushing has a nylon bearing in which it is journaled, so that it may rotate or have relative movement with respect thereto, while the nearing is provided with novel locking means that engage the bearing and the A frame so as to prevent relative movement or rotation of the bearing with respect to the A frame.

It is also apparent that the present invention has provided a novel locking means for the bearing in which the adjusting bushing is disposed so that the bearing will not rotate with respect to the A frame and therefore, there will be no inordinate wear and which locking means and bearing will not in any way interfere with the normal adjustment of the adjusting bushing as used heretofore.

Inasmuch as various changes may be made in the form, location and relative arrangement of the several parts without departing from the essential characteristics of the invention, it will be understood that the invention is not to be limited except by the scope of the appended claims.

I claim:

1. In combination with a vehicle frame, a pivot shaft secured to said frame, an eccentric adjustable bushing supported on the end of said pivot shaft, means for adjusting said adjusting bushing in a predetermined fixed relationship on said pivot shaft to change the eccentricity of said bushing, bearing means rotatably supported on said adjusting bushing, a control arm mounted upon said bearing means, and locking means for preventing relative rotation of said bearing means with respect to said control arm.

2. In combination with a vehicle frame, a control arm member, a pivot shaft secured to said frame, means mounting said control arm upon said pivot shaft, including an adjusting bushing, said adjusting bushing having a cylindrical outer surface formed thereon and a longitudinal bore formed therethrough eccentrically positioned with respect to said cylindrical outer surface, a portion of said pivot shaft being disposed within said bore, means for rigidly connecting said adjusting bushing to said pivot shaft to prevent relative rotation with respect thereto, bearing means disposed on the outer cylindrical surface of said bushing to permit relative rotation of said bushing with respect to said bearing means, said bearing means being disposed within openings in said control arm member, and locking means engaging said bearing means and said control arm member to prevent relative rotation of said bearing means with respect to said control arm.

3. The combination of claim 2, wherein said locking means comprises a circular member having a central opening therein disposed on said bearing member and having lug means intermeshing with said control arm and said bearing means.

4. The combination of claim 2, wherein said locking means comprises a flat vertical member having a central opening therein slidably mounted on said bearing means and having oppositely disposed lug means engaging said bearing means and said control arm.

5. The combination of claim 2 wherein said bearing means comprises a cylindrical member having a cylindrical inner surface and an outer surface of different diameters and a radially outwardly extending portion thereon with notch means therein, said locking means comprising a shim member having a central opening therein slidably disposed on said bearing member adjacent said outwardly extending radial portion, and lug means on said shim member projecting into said notch means, and other lug means engage said control arm.

6. In a vehicle independently sprung front wheel assembly, a pivot shaft for pivotally mounting the front wheel assembly, an adjusting bushing having a cylindrical outer surface and longitudinally extending bore formed therethrough eccentrically disposed with respect to said outer cylindrical surface, one end portion of said pivot shaft extending through said bore, said pivot shaft having a shoulder formed thereon, washer means disposed on said shaft portion adjacent said shoulder, said adjusting bushing being disposed adjacent said washer means on said shaft portion, pressure plate means and other washer means adjacent the opposite end of said adjusting bushing, cap screw means locking both washer means and pressure plate and adjusting bushing in fixed relationship with each other on said pivot shaft, bearing means disposed on said adjusting bushing and said adjusting bushing journaled therein for relative rotation therewith, and locking means mounted on said bearing means, and a control arm having openings for receiving said bearing means therein, said locking means securing said bearing means to said control arm to prevent relative movement and relative rotation with respect to each other.

7. The assembly of claim 6, wherein said locking means comprises a thin shim member having a central opening therein slidably mounted on said bearing means and lug means engaging said bearing means and said control arm.

8. The apparatus of claim 7, wherein said lug means consists of radially outwardly extending ears adapted to be bent in a direction transverse to the axis of said shim member.

9. A vehicle frame, a pivot shaft secured to said frame, an eccentric adjusting bushing fixed on said pivot shaft, means for adjusting the bushing on said pivot shaft to change the eccentricity thereof, a nylon bearing journaled on said bushing, an A frame member carrying said bearing, a thin shim member having a central opening therein, and lug means fixed to said shim member and locking said bearing member to said A frame.

References Cited in the file of this patent
UNITED STATES PATENTS

| | | |
|---|---|---|
| 1,044,055 | Johnson et al. | Nov. 12, 1912 |
| 1,585,758 | Buckwalter | May 25, 1926 |
| 1,642,640 | Bouch et al. | Sept. 13, 1927 |
| 2,286,755 | Morton et al. | June 16, 1942 |
| 2,431,480 | Hornsby | Nov. 25, 1947 |
| 2,502,744 | Parker | Apr. 4, 1950 |
| 2,685,483 | Morra | Aug. 3, 1954 |
| 2,859,058 | Traugott | Nov. 4, 1958 |
| 2,862,741 | Baker | Dec. 2, 1958 |
| 2,890,893 | Laukhuff | June 16, 1959 |